United States Patent [19]
Margetts

[11] 3,719,258
[45] March 6, 1973

[54] VEHICLE BRAKES
[75] Inventor: Hugh Grenville Margetts, Birmingham, England
[73] Assignee: Girling Limited, Birmingham, England
[22] Filed: Aug. 23, 1971
[21] Appl. No.: 173,989

[30] Foreign Application Priority Data
Aug. 24, 1970 Great Britain..................40,573/70

[52] U.S. Cl. .....................188/79.5 P, 188/196 BA
[51] Int. Cl. ..............................................F16d 65/56
[58] Field of Search .....188/79.5 K, 79.5 P, 79.5 GC, 188/79.5 GT, 106 A, 196 BA

[56] References Cited

UNITED STATES PATENTS 3,621,947  11/1971  Margetts..........................188/79.5 P Primary Examiner—Duane A. Reger
Attorney—Scrivener, Parker, Scrivener and Clarke

[57] ABSTRACT

An auto-adjuster mechanism for an internal shoe drum brake of the type having an adjustable length strut through which handbrake actuating forces are transmitted from a handbrake mechanism to the shoes is characterized by a pawl and ratchet adjuster of which the pawl is pivotally mounted and is subjected to the action of a coil spring stressed both in torsion (to urge the pawl in a direction to effect adjustment) and in compression (to urge the pawl yieldingly into engagement with the ratchet) and only operates to effect adjustment of the strut during operation of the service brake means.

3 Claims, 5 Drawing Figures

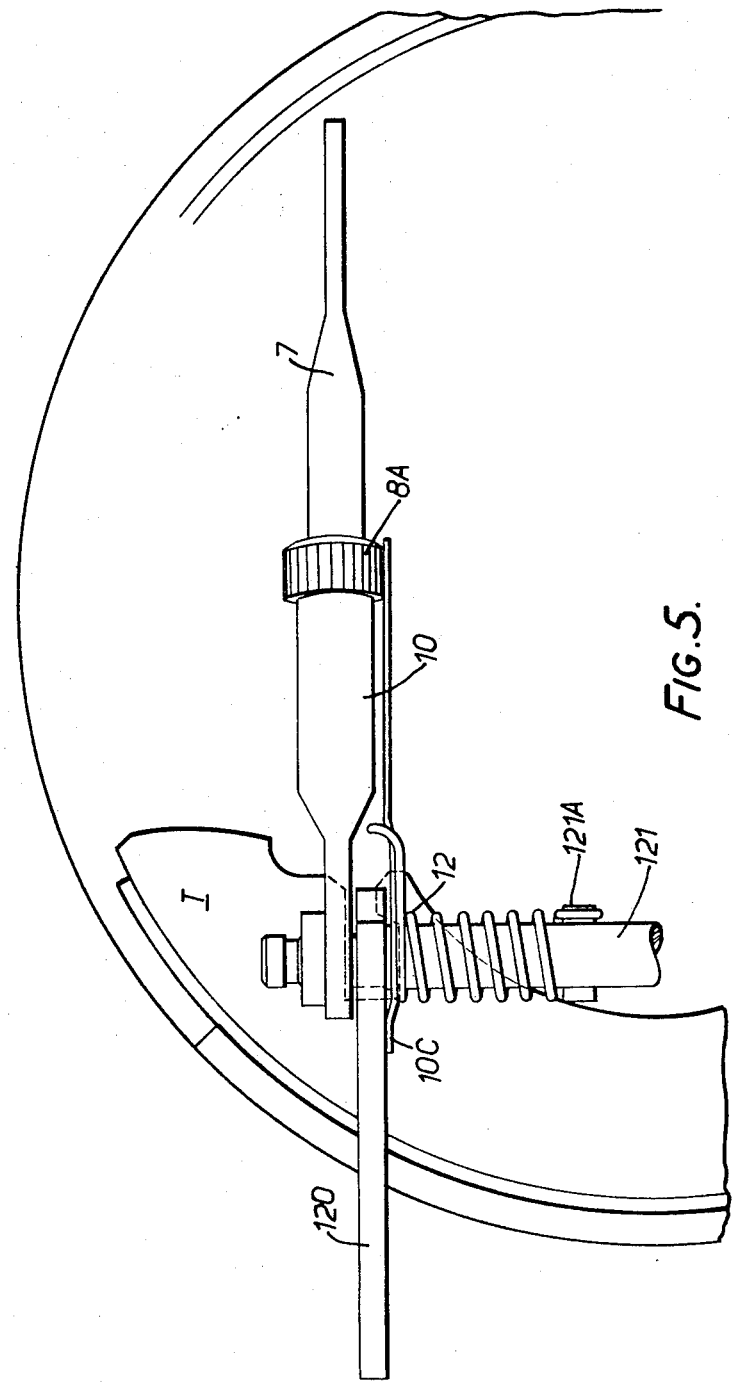

VEHICLE BRAKES

The Complete Specification of our prior British Patent Number 1,199,191 described and claims an internal shoe drum brake including a pair of brake shoes which can be expanded, against the action of shoe return spring means, alternatively by power actuated service brake means or by manually actuated auxiliary brake means, a strut of adjustable length which transmits manually applied loads between the shoes but is relieved of load upon actuation of the service brake means, the strut comprising a pair of relatively rotatable members screw-threaded together, and pawl and ratchet means for effecting relative rotation of the members to lengthen the strut in response to excess travel of the brake shoes upon brake actuation, wherein such relative rotation is effected only when the service brake is operated to relieve the load imposed on the strut by the return spring means.

The present invention relates to additions or modifications to brakes of this form, and provides such a brake in which a pawl spring in the form of a coil spring pre-stressed in torsion and in compression acts on the pawl on the one hand to bias it to rotate in a sense to increase the length of the strut and on the other hand urge the pawl laterally into engagement with the ratchet, the rotational force applied to the pawl by the spring being intermediate the force required to overcome the frictional resistance to rotation of the strut parts when the strut is subjected to load by the shoe return springs and the force required to effect such rotation when the shoe return spring load is relieved by service brake actuation.

A preferred embodiment of the present invention is described below, by way of example only, with reference to the accompanying drawings, in which.

Figure 3:
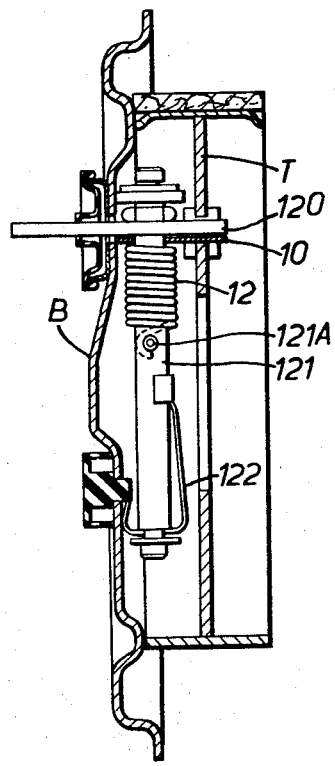
Figure 4:
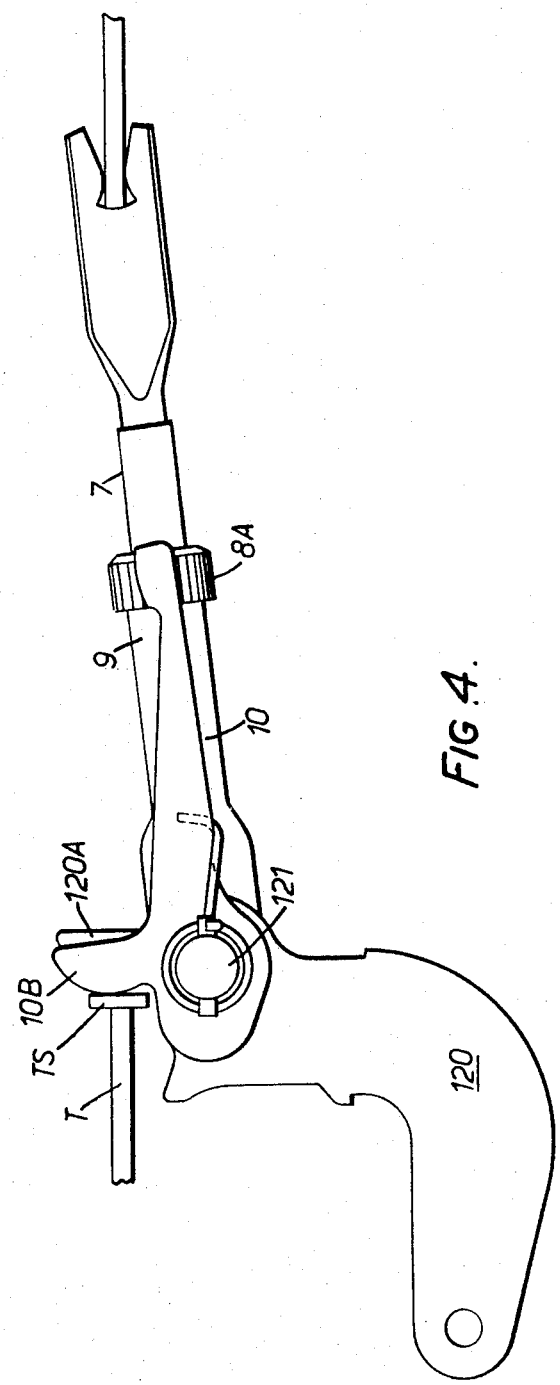

FIGS. 4 and 5 are plan and side elevations on an enlarged scale of part of the brake The brake illustrated in the accompanying drawings is generally similar in construction and operation to that described in the Complete Specification of British Patent No. 1,199,191, with particular reference to FIGS. 3, 4, and 5 thereof. It comprises a back plate B, a pair of brake shoes L and T, a fixed abutment A and a double ended brake sleeve cylinder for applying the service braking load to the adjacent tips of the respective brake shoes.

The auxiliary (parking) brake load is applied through a handbrake mechanism including a cross-pull lever 120 having a lug 120A engaging a slipper plate TS in a window with trailing shoe T. The lever 120 is mounted on a shaft 121 which extends generally parallel with the back plate and which has its lower end supported in a bracket 122 permitting rotation of the shaft and lever and also permitting a degree of articulation of the lever about an axis extending parallel with the main axis of the brake drum.

Figure 1:
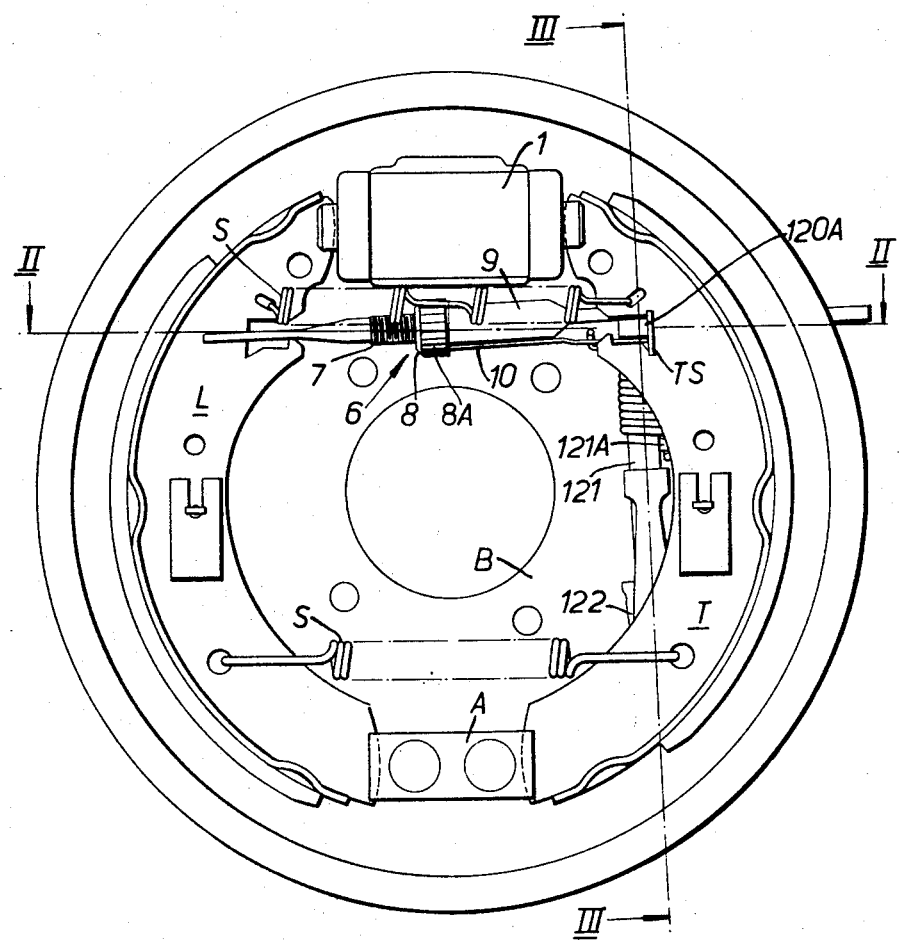
FIG. 1 is a side elevation of one form of drum brake in accordance with the invention.
Figure 2:
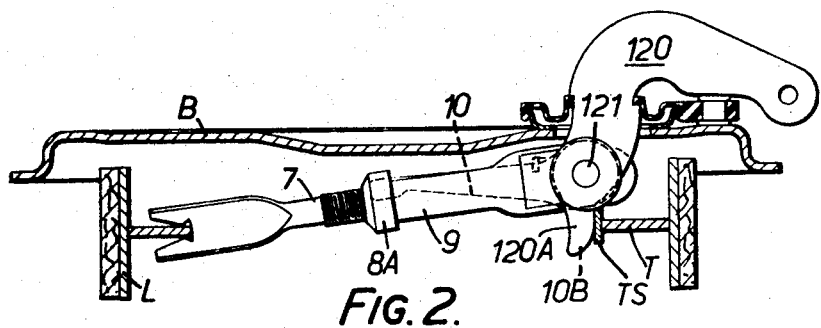
FIGS. 2 and 3 are sections in the lines II—II and III—III of FIG. 1.

The shaft 121 also engages one end of a strut 6 comprising a screw 7, a nut 8 formed with a ratchet wheel 8A and a tube 9, which at its outer end bears against the leading shoe L. As so far described, it will be understood that rotation of lever 120 in the anti-clockwise direction (as viewed in FIG. 2) will cause lug 120A to push the trailing shoe outwardly (to the right), the reaction causing shaft 121 to move in the opposite direction, this movement being transferred to the leading shoe L by the strut 6 extending between the shaft and the leading shoe.

A pawl 10 is also mounted in the shaft 121 for rotation about the axis thereof and has a lug 10B engaging the slipper plate TS. A coil torsion spring 12, surrounding the shaft 121 has one end anchored to the shaft by a pin 121A and at its other end acts on the pawl 10. The spring is pre-stressed in torsion in a sense to apply a continuous biassing force to the pawl 10 tending to rotate the pawl in the anti-clockwise direction (as viewed in FIG. 2), the direction in which the pawl moves to rotate the ratchet wheel 8A and thereby increase the length of strut 6 to compensate for wear of the friction lining. Such rotation of the pawl is normally resisted by the reaction of the brake return springs in the "brakes off" condition.

The spring 12 is also pre-stressed in compression to urge the pawl axially of the shaft 121, into engagement with the adjacent surface of lever 120. As best seen in FIG. 5, the pawl has an offset portion 10C bearing against the lever, to provide a rocking fulcrum for the pawl about an axis extending transversely to the rotational axis of the pawl. Thus, as viewed in FIG. 5, the pawl is urged to rock in the anti-clockwise direction, so that the tip of the pawl is pressed yieldingly into engagement with the ratchet wheel.

No adjustment is effected during handbrake operation since the frictional resistance to relative rotation of the strut parts is too great for the torsion in the coil spring 10, which therefore yields to permit the pawl lug 10A to separate from the slipper plate TS. This high frictional restraint arises because the strut is loaded by the shoe return springs throughout handbrake operation.

In service brake operation, however, the strut is relieved of the return spring load, and outward movement of the shoe T permits the pawl 10 to rotate under the action of the spring 12 to effect any increase in the length of the strut by rotation of the ratchet wheel 8A. This condition is illustrated in FIG. 4. Upon brake release, the pawl is able to ride over the crests of the ratchet teeth by rocking about its fulcrum 10C, against the restoring action of the spring 12.

In addition to its two primary functions described above, the spring 12 serves the further useful function of maintaining the adjustment strut in contact with the further brake shoe L. The pawl acts, through its lug 10C on the brake shoe T, the reaction being transmitted through the shaft 121 to the strut 6, which finds its own position of equilibrium by rocking in its mounting bracket 122.

The use of a coil torsion spring to apply the operating biassing force to the pawl has the further advantage that such a spring is readily designed to have a low spring rate and to have a precisely set pre-load in torsion. It can also be very compact and readily mounted, which is advantageous when space is at a premium.

I claim:

1. An internal shoe drum brake including a pair of brake shoes which can be expanded, against the action of shoe return spring means, alternatively by power actuated service brake means or by manually actuated auxiliary brake means, a strut of adjustable length which transmits manually applied loads between the shoes but is relieved of load upon actuation of the service brake means, the strut comprising a pair of relatively rotatably members screw-threaded together, and pawl and ratchet means for effecting relative rotation of the members to lengthen the strut in response to excess travel of the brake shoes upon brake actuation, wherein such relative rotation is effected only when the service brake is operated to relieve the load imposed on the strut by the return spring means, wherein a pawl spring in the form of a coil spring pre-stressed in torsion and in compression acts on the pawl on the one hand to bias it to rotate in a sense to increase the length of the strut and on the other hand to urge the pawl laterally into engagement with the ratchet, the rotational force applied to the pawl by the spring being intermediate the force required to overcome the frictional resistance to rotation of the strut parts when the strut is subjected to load by the shoe return springs and the force required to effect such rotation when the shoe return spring load is relieved by service brake actuation.

2. A brake according to claim 1, wherein the pawl and a brake applying lever forming part of the manually actuated auxiliary brake means are mounted upon a shaft extending generally parallel to the back plate of the brake, for rotation about the axis of the shaft, the said shaft being mounted at its opposite end for articulating movement about an axis extending parallel with the axis of rotation of the brake drum and serving to transmit handbrake actuating forces from the brake applying lever to the said strut.

3. A brake according to claim 1, wherein the pawl is arranged for rocking movement about an axis extending transversely to its axis of rotation, being biassed by the pawl spring into engagement with the ratchet and rockable about its rocking axis against the action of the pawl spring to ride over the teeth of the ratchet during operation.

* * * * *